May 27, 1930. E. G. STRECKFUSS 1,760,670
MEAT SLICER
Filed July 14, 1927 4 Sheets-Sheet 1
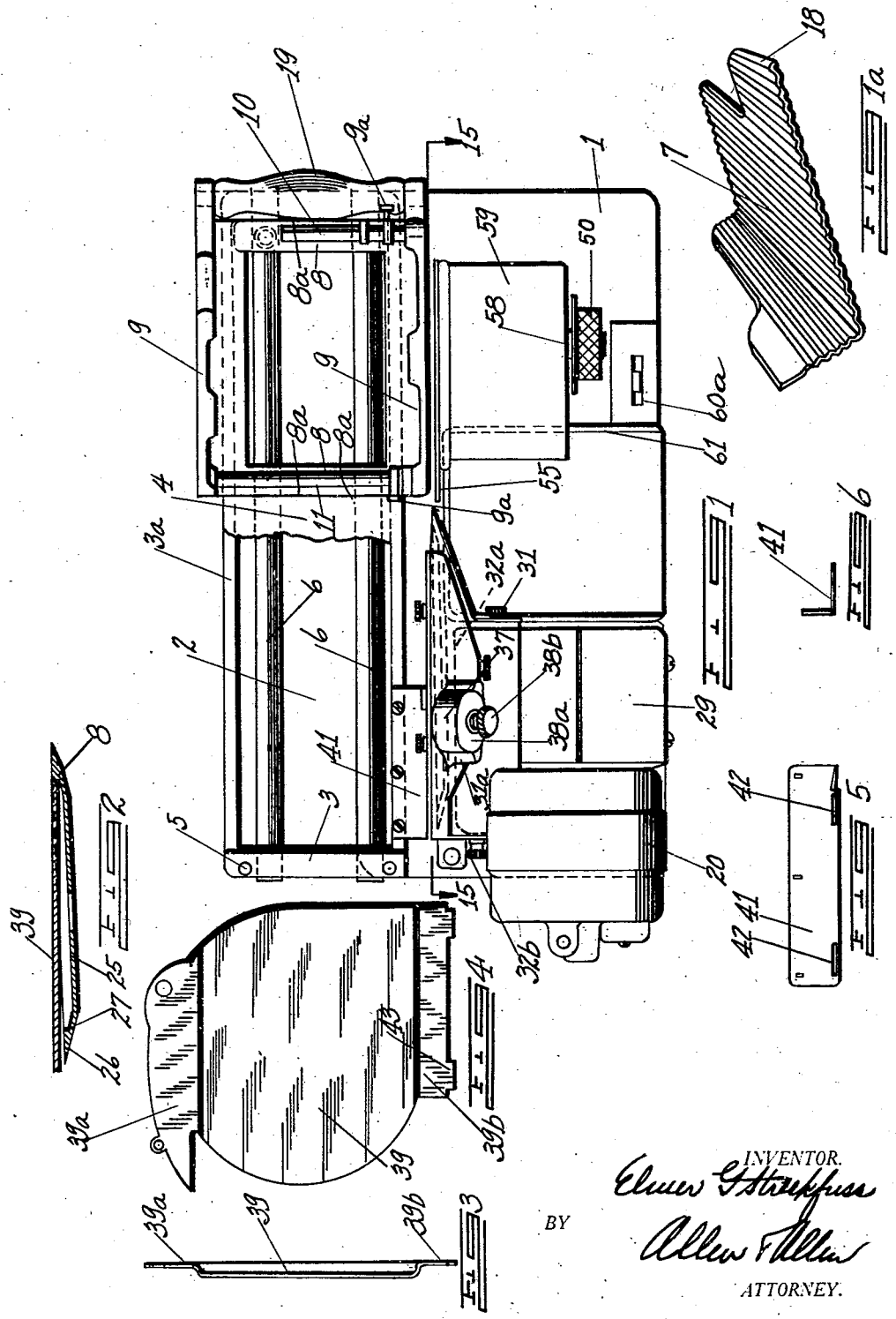
INVENTOR.
Elmer G Streckfuss
BY
Allen F Allen
ATTORNEY.

May 27, 1930.  E. G. STRECKFUSS  1,760,670
MEAT SLICER
Filed July 14, 1927   4 Sheets-Sheet 2
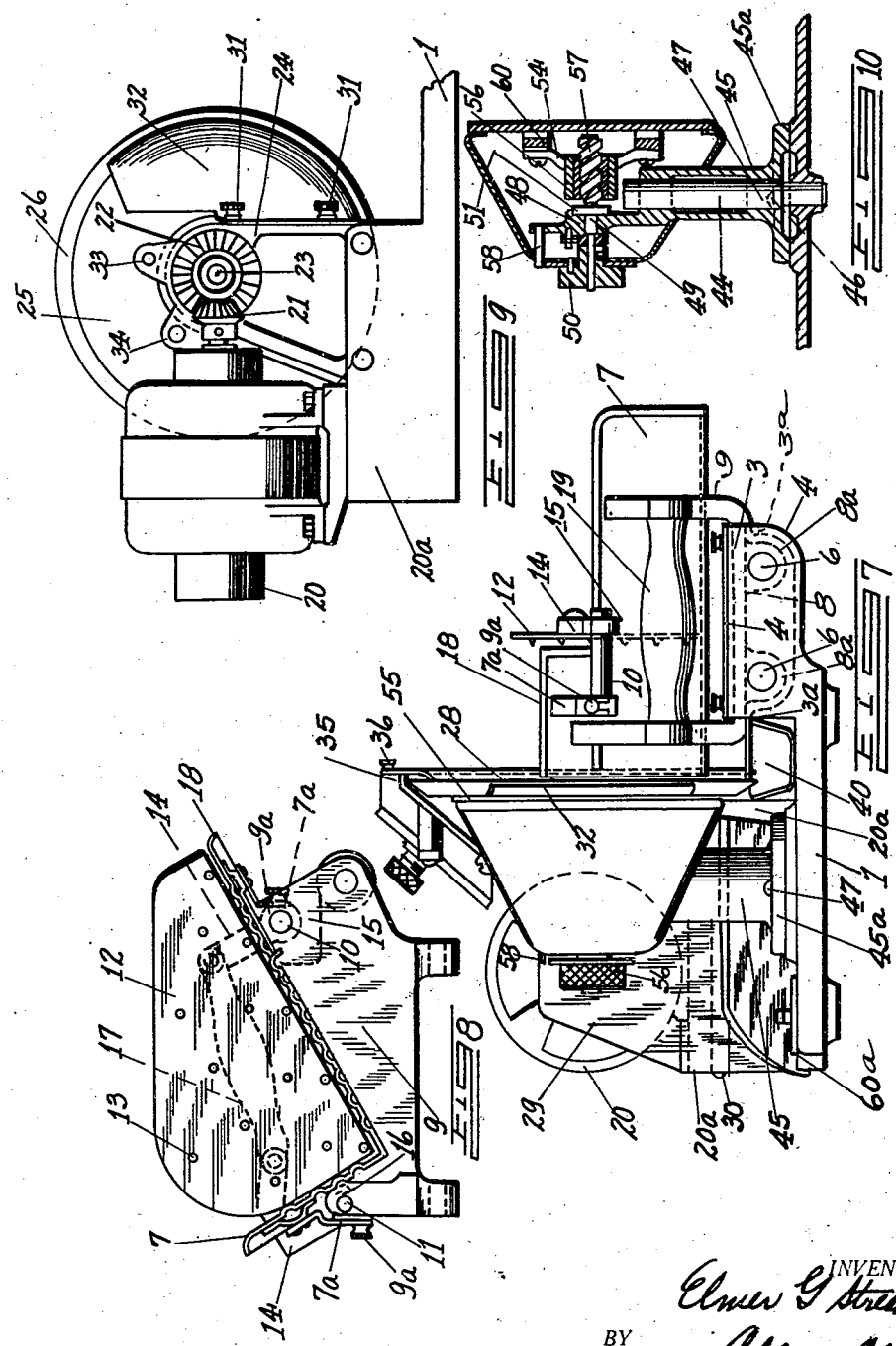
INVENTOR.
Elmer G Streckfuss
BY
Allen & Allen
ATTORNEY.

May 27, 1930.  E. G. STRECKFUSS  1,760,670
MEAT SLICER
Filed July 14, 1927   4 Sheets-Sheet 3
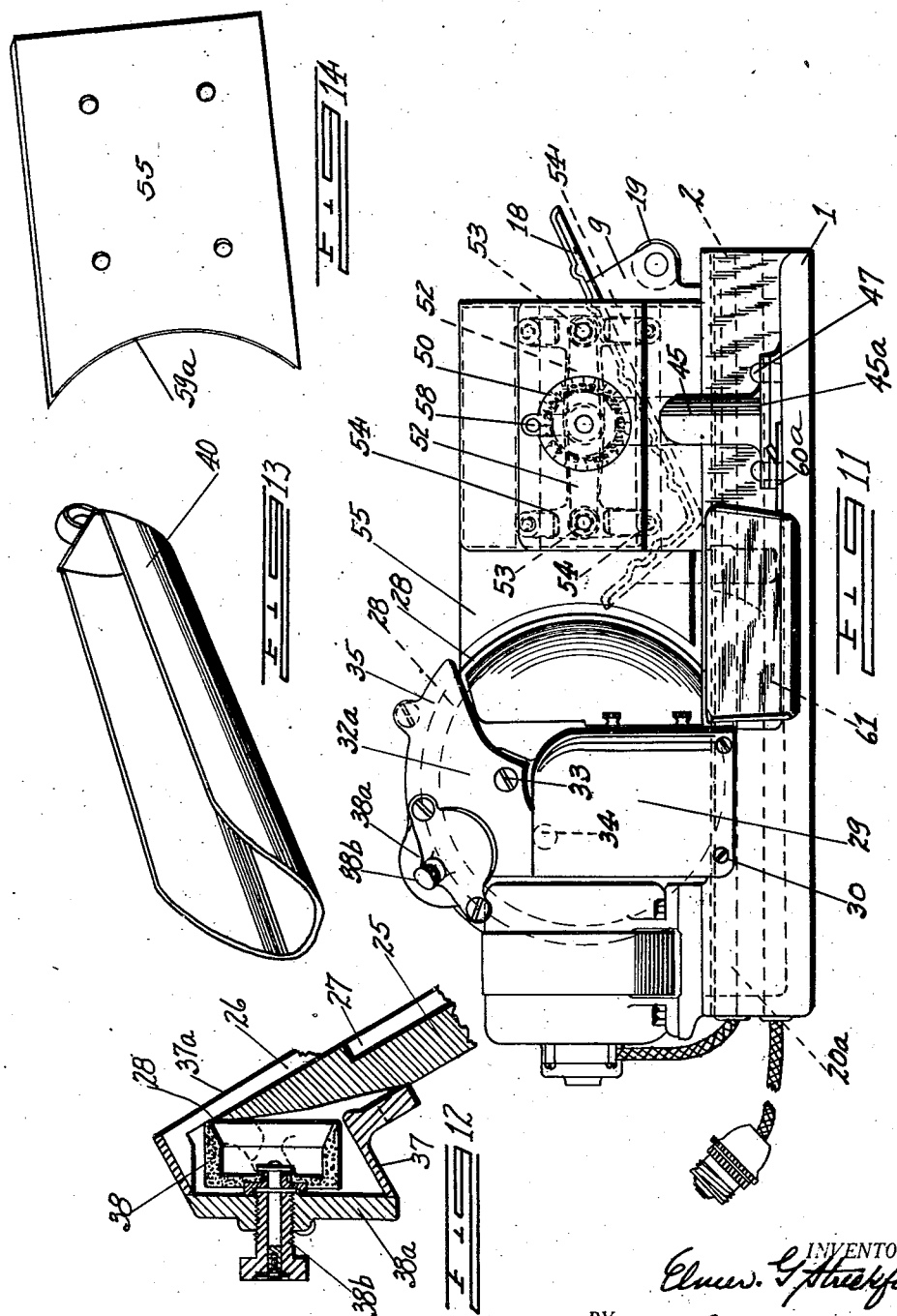
INVENTOR.
Elmer G. Streckfuss
BY
Allen & Allen
ATTORNEY.

May 27, 1930.  E. G. STRECKFUSS  1,760,670
MEAT SLICER
Filed July 14, 1927   4 Sheets-Sheet 4
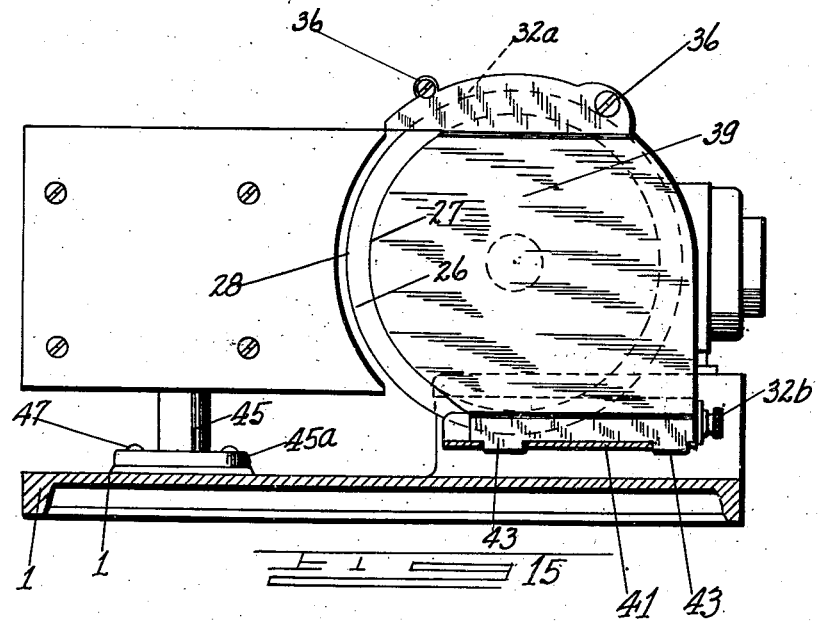
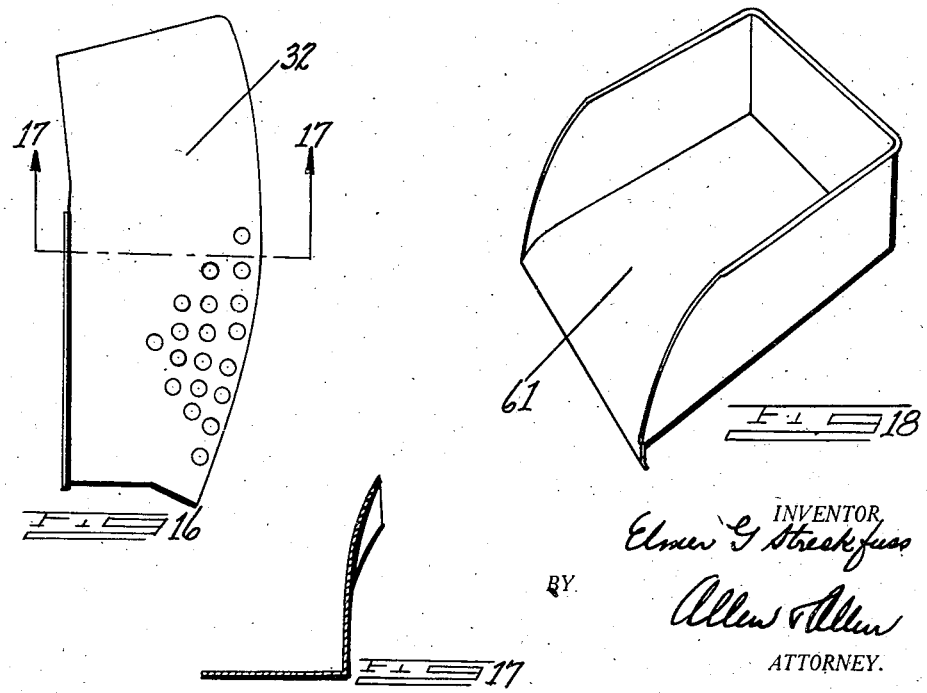
INVENTOR
Elmer G. Streckfuss
BY
Allen & Allen
ATTORNEY.

Patented May 27, 1930

1,760,670

UNITED STATES PATENT OFFICE

ELMER G. STRECKFUSS, OF CINCINNATI, OHIO, ASSIGNOR TO THE CINCINNATI TIME RECORDER COMPANY, OF CINCINNATI, OHIO, A CORPORATION OF OHIO

MEAT SLICER

Application filed July 14, 1927. Serial No. 205,772.

My invention relates to meat slicers, and more particularly to those slicers in which a meat tray is moved manually back and forth past a revolving knife, the meat being advanced by hand toward the knife, as the slices are removed.

It is the object of my invention to provide a meat slicing machine, and one which can be used for slicing other articles such as bread, sausage, and the like, in which the parts are simple to make and assemble, and which, where there is necessity for cleaning, are readily removable.

In connection with the gauge or slice adjuster which defines the thickness of slice, I provide a plate of the type which engages the meat as it passes to and fro by the knife, the novel features of my plate being the simple structure, and being so mounted that without disassembly it can be rotated away from the knife for cleaning.

In connection with the knife, it is my object to provide a revolving knife, which is surrounded except for the cutting edge by means of a guard. In order to permit the use of a knife surrounding guard and employ a knife which has a shoulder behind the blade, behind which shoulder the edge of the guard toward the slicing point can lie, I slant the knife at an angle, and extend the guard in line with the travel of the meat tray, thus permitting cutting as long a slice as the meat tray is built for.

In connection with the meat tray, it is my object to mount it so as to slide back and forth above a removable plate which lies over the guide rods, which plate can be readily cleaned. I also provide a meat advancing plate and mount this removably on simple guide rods forming part of the frame of the meat tray.

The above and other advantages to be noted, I accomplish by that certain construction and arrangement of parts to be hereinafter more specifically pointed out and claimed.

In the drawings:—

Figure 1 is a top plan view of the complete machine except for the fact that the cover plate over the guide rod trough for the meat tray frame is removed and the meat tray is removed.

Figure 1ª is a perspective of the meat tray.

Figure 2 is a detail section taken through the knife and the face guard thereof.

Figure 3 is a side elevation of the face guard.

Figure 4 is a front elevation of the face guard.

Figure 5 is a plan view of the cover over the scrap channel in the base, which also supports the face guard.

Figure 6 is an elevation showing the part illustrated in Figure 5 from its forward edge.

Figure 7 is a front elevation of the machine.

Figure 8 is a side elevation of the meat tray and support, removed from the machine, same being taken from the knife side thereof.

Figure 9 is a detail elevation of the drive for the knife, with the cover removed from the gearing.

Figure 10 is a central vertical section taken through the slice adjusting plate mechanism.

Figure 11 is a side elevation of the complete machine taken from the slice adjuster and motor drive side thereof.

Figure 12 is a detail section of the sharpener mechanism.

Figure 13 is a perspective of the scrap tray.

Figure 14 is a detail perspective of the slice adjuster plate by itself.

Figure 15 is a section on the line 15—15 of Figure 1.

Figure 16 is a detail elevation of the knife back guard and slice deflecting plate.

Figure 17 is a section on the line 17—17 of Figure 16.

Figure 18 is a perspective detail of the slice receiving tray.

The machine is arranged upon a base 1, which has on the meat side of the machine a long trough-like portion 2, raised at the ends at 3. This leaves the sides 3ª of the trough lower than the ends, and a plate 4 is set over the ends to close the trough except for the gap left between the sides of the trough and the plate. Holes 5 on the top edges of the trough engage lugs on the plate to hold it in a position from which it is easily removable for cleaning. Extending lengthwise of the trough are a pair of guide rods 6, 6, and the meat carrying tray 7 is supported on a frame. This frame has a base 8 lying over the rods and under the plate, the base having two pairs of bosses 8ª that slidingly engage the rods. The sides 9 of the frame extend out over the sides of the trough through the gaps between the plate 4 and the sides 3ª, and thence upwardly for the support of the tray. The tray rests on the two side pieces, and is held down by means of screw studs 9ª, which engage forks 7ª on the tray.

One of the sides, at a point adjacent the top of the tray at the front thereof, is provided with a guide rod 10, and the other of the sides 9 has a projection which lies at the back end of the tray which is connected to the first side 9 by a guide rod 11. The meat advancing plate, when it is desired to use the same, is set over the guide rods and can be pulled off of the rods at will, to use the machine without the advancing plate. The plate proper, as shown at 12, has spikes 13 therein to engage the meat, and has a pair of mounting arms 14 secured thereto, one of which has a boss 15 to slide over the guide rod 10, and the other a fork 16 to ride over the companion rod 11. There is a handle across between the two arms, as indicated at 17, which handle is behind the plate (considering the spiked side as the front). The arms are arranged so that one passes over the top of the front edge of the tray, and the other is located beyond the rear edge of the tray. The tray, as illustrated in Figs. 7 and 8, will be noted as having a portion at 18 which is higher and longer than the rest of the tray, so as to provide the fullest grasp over the meat near the line of cut.

The handle 19, secured across the frame of the tray, can be used to advance the tray, or when the meat advancing plate is used, the handle thereof can be employed both for moving the tray to and fro on the main guide rods, and advancing the plate crosswise of the tray on the rods 10 and 11.

The machine is shown as being driven by a motor 20. This motor is set on an elevated portion 20ª of the frame at a slight angle to the line of movement of the tray. Its shaft is equipped with a beveled gear 21, which meshes with a beveled gear 22 that is located on the shaft 23 of the knife. The knife is mounted in an upward projection 24 of the frame, and is formed with a body 25, a rim 26, which is thicker than the body so as to present a shoulder 27, and a cutting edge 28. The shaft of the knife, and projection on the frame, and the knife itself in consequence are set so that the knife is at a slight angle (Fig. 2), so as to bring its forward or cutting edge nearer to the path of the meat or the line of movement of the tray, than is its rear edge.

A guard or cover 29 is set over the gear drive and held in place by screws 30. The projection on the frame that supports the knife shaft has thumb screws at 31, 31, by means of which the back guard of the knife is mounted. This back guard is preferably provided so as to cover the back of the knife from the drive housing to the meat cutting edge, as indicated at 32. There is a top guard 32ª for the knife, which is secured by thumb screws to the lugs 33 and 34 on the upward projection of the frame. This guard covers the top and rear portions of the knife and presents a face or edge 35 beyond the knife edge, from the cutting portion, and back over the top to the base of the machine at the rear, against which edge the front knife guard is mounted by means of thumbscrews as at 36, which enter holes in the said edge. The lower end of the guard 32ª is forked to engage over a thumb screw 32ᵇ secured to a portion of the motor base.

The last noted guard as indicated in Figure 12 has also a ring shaped portion 37, with bosses 37ª at the sides, within which is mounted the knife sharpener wheel. This wheel, as shown at 38, is mounted on the end of a screw 38ᵇ which is located in a plate 38ª. The wheel revolves with relation to the screw. The screw itself passes through a threaded hole in the plate 38ª which is screwed to the bosses 37ª, and by means of the screw the wheel can be advanced for purposes of sharpening.

The front face meat guard is in the form of a plate 39 (Fig. 4), which is shaped to lie behind the shoulder of the knife (Fig. 2) at the front. For about one fourth of the periphery of this shoulder, which is the slicing portion of the knife, the plate lies behind the shoulder. It then passes beyond the shoulder with a slight swelling out thereof at top and bottom as at 39ª and 39ᵇ, but extends fairly without deflection straight back in the line of travel of the meat tray. The deflection of the knife blade is such that this face guard can cover the blade completely, except at the cutting edge, where it lies behind the shoulder, without being swelled out to pass beyond the shoulder at the rear of the machine.

When the tray is moved back and forth, and the knife slices through a piece of meat, the meat will have a flat surface to move along, with no projection at the rear which will stop its movement or disturb its position, and with the front guard substantially flush with the exposed cutting portion of the knife.

Between the motor base and the side 3ª nearest it, is a chamber which extends beneath the lower edge of the knife, and I provide a narrow tray 40, which slides in this chamber. To cover the tray, except beneath the cutting edge of the knife, I provide a cover plate 41, which is screwed to the side 3ª, and extends across to a point close to the lower portion of the knife. This plate 41 has slots 42 therein which are engaged by tongues 43 on the lower edge of the face guard plate.

It may be observed that the knife is completely enclosed by my structure, except for the very edge thereof, at the point where the meat is sliced.

The slice adjuster plate mechanism is mounted on a sleeve 45 set over a post 44 and which terminates in a base flange 45ᵃ. This flange has holes 46 therein, which lie over studs 47 set into the base of the machine. The sleeve can be lifted so as to be free of the studs, and revolved away from the knife for cleaning, so as to run no danger of the operator working close to the knife edge.

Mounted on the sleeve is a casting having a boss 48, which is not threaded, and through which passes the smooth shank portion 49 of the adjusting screw. The screw has an operating head 50 and a flange 51 inside of the boss which prevents the screw from lengthwise travel therein. The casting also has two arms 52 which carry guide rods 53, 53. The guide rods support a frame having two uprights 54, to which uprights the meat slice adjusting plate 55 is screwed. The frame is also provided with a central internally threaded boss 56, connected to the two uprights, into which boss the threaded portion 57 of the adjusting screw passes.

In order to mount a protective housing over the mechanism last described, I provide for a guide pin 58, projecting from the main casting on the sleeve, and provide a casing 59 shaped to fit over the mechanism, except for the adjuster plate itself.

The housing is also provided with cross straps 60, which upon assembly, are located just before the uprights on the frame that holds the adjusting plate, and the screws which mount the adjusting plate to the uprights, also enter the cross straps, and hold the housing so that it moves with the adjusting plate.

This device prevents the housing from gaping away from the plate during adjustment. The housing slides over the guide pin 58.

In assembly the hand wheel on the adjusting screw is set in place last and held on the screw by means of a set screw or in any other desired way.

The adjusting plate lies in parallelism with the path of the meat tray, and has a curved edge 59ᵃ which lies close up to the cutting edge of the knife.

In operation the user will press on the meat as he moves the tray back and forth, and the meat can advance no further than the plate, thus being held for a given thickness of slice.

The switch for the motor is mounted in a raised portion 60ᵃ of the main frame or base, and between this portion and the raised portion for the motor, I place a meat collecting tray 61, which fits into this space. The tray lies at its forward edge beneath the cutting edge of the knife, so as to catch all slices of meat. The meat cannot pass around behind the knife on account of the back guard plate, which is close up against the back of the knife.

It will be evident that various mechanical features equivalent to those noted could be employed in accomplishing my several objects, and I do not wish to be taken as representing that the particular parts shown, and particular assembly, are the only ways in which my invention can be accomplished. I have described in full one embodiment of my invention, and will set forth the invention itself in the appended claims.

Having thus described my invention what I claim as new and desire to secure by Letters Patent is:—

1. In a slicing machine, the combination with a base, a rotary knife supported on said base, a trough having guide rods therein, and having its ends higher than its sides, frame means slidingly mounted on the guide rods, and extending out from the sides of the tray, a cover plate secured to the ends of the trough, and hence lying out of the path of said frame means, a tray mounted on said frame means, said knife located near one of said sides, and a narrow pan located adjacent the said side and beneath the knife for catching particles of the sliced article.

2. In a slicing machine, a slice adjuster plate located in substantial parallelism with a rotary knife, a support for said plate, means for adjusting the plate with relation to said support to gauge the thickness of slice, said support having a slidable and rotary mounting, whereby it can be turned away from proximity to the knife for cleaning.

3. In a slicing machine, a slice adjuster plate located in substantial parallelism with a rotary knife, a support for said plate, means for adjusting the plate with relation to said support to gauge the thickness of slice, said support having a slidable and rotary mounting, whereby it can be turned away from proximity to the knife for cleaning, said mounting comprising a post and a sleeve mounted to slide and revolve on said post, and means on the machine to engage and hold said sleeve against rotary motion when the plate is in position.

4. A support for a slice adjusting plate in slicing machines comprising a post, a sleeve sliding and rotating on said post, and having a supporting, guiding and actuating means for the slice adjusting plate thereon, and means for engaging said sleeve against rotation, when in its lowermost position as held by gravity, but releasing said sleeve for rotation upon an elevation thereof, for the purpose described.

5. In a slicing machine, a slice adjuster plate mechanism comprising a support having guide rods, a plate retaining frame mounted on the guide rods, an adjusting screw arranged to rotate in the support, said plate retaining frame having a threaded portion to engage the screw, whereby the revolution of the screw will move the frame and hence the plate, and a cover for the operated portion of the support, said cover arranged to move with the plate as it is adjusted by the screw, and having an opening to clear the adjusting screw permitting said screw to project for operation.

ELMER G. STRECKFUSS.